US012780088B2

(12) United States Patent
Fish et al.

(10) Patent No.: US 12,780,088 B2
(45) Date of Patent: Nov. 3, 2026

(54) SYSTEMS AND METHODS FOR VEHICLE SIGNALING AND BARGAINING

(71) Applicant: GEORGIA TECH RESEARCH CORPORATION, Atlanta, GA (US)

(72) Inventors: Francis J. Fish, Newark, DE (US); Bert Bras, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 11 days.

(21) Appl. No.: 18/841,614

(22) PCT Filed: Feb. 28, 2023

(86) PCT No.: PCT/US2023/014049
§ 371 (c)(1),
(2) Date: Aug. 26, 2024

(87) PCT Pub. No.: WO2023/172406
PCT Pub. Date: Sep. 14, 2023

(65) Prior Publication Data
US 2025/0170955 A1 May 29, 2025

Related U.S. Application Data

(60) Provisional application No. 63/317,713, filed on Mar. 8, 2022.

(51) Int. Cl.
*B60Q 1/50* (2006.01)
*B60Q 1/34* (2006.01)
(Continued)

(52) U.S. Cl.
CPC ............... *B60Q 1/535* (2022.05); *B60Q 1/46* (2013.01); *B60Q 1/547* (2022.05); *G08G 1/166* (2013.01); *B60Q 1/34* (2013.01); *B60Q 1/44* (2013.01)

(58) Field of Classification Search
CPC .......... B60Q 1/535; B60Q 1/46; B60Q 1/547; B60Q 1/34; B60Q 1/44; G08G 1/166
See application file for complete search history.

(56) References Cited

U.S. PATENT DOCUMENTS 11,004,344 B2 * 5/2021 Bergquist .............. B60W 30/16
2002/0171542 A1 * 11/2002 Bloomfield .............. B60Q 1/52
340/463

(Continued)

OTHER PUBLICATIONS

International Search Report and Written Opinion received in PCT/US2023/014049 mailed Jul. 28, 2023.

*Primary Examiner* — Hunter B Lonsberry
*Assistant Examiner* — Harrison Heflin
(74) *Attorney, Agent, or Firm* — Meunier Carlin & Curfman LLC

(57) ABSTRACT

An improved vehicle signaling and control system (150) is provided. In one aspect the system uses existing sensors (110) in a vehicle (100) to detect when another vehicle is too close (400). When the too close vehicle is a following vehicle, the system may cause existing rear lights (105), such as rear brake lights, to activate and signal to a driver of the vehicle that they are too close and should slow down (440). In addition, the system may detect, using the sensors, that a lane adjacent to the too close vehicle is empty (450), and may further activate lights such as turn signals to signal to the driver that they should change lanes (460).

15 Claims, 8 Drawing Sheets

(51) Int. Cl.

| | |
|---|---|
| ***B60Q 1/44*** | (2006.01) |
| ***B60Q 1/46*** | (2006.01) |
| ***G08G 1/16*** | (2006.01) |

(56) References Cited

U.S. PATENT DOCUMENTS

| | | | | |
|---|---|---|---|---|
| 2004/0012488 | A1 | 1/2004 | Schofield | |
| 2007/0216520 | A1 | 9/2007 | Ho | |
| 2012/0306664 | A1 | 12/2012 | Geter | |
| 2013/0116859 | A1* | 5/2013 | Ihlenburg | B60W 30/09 701/1 |
| 2014/0107867 | A1* | 4/2014 | Yamashiro | B60W 10/18 701/2 |
| 2018/0188745 | A1* | 7/2018 | Pilkington | G08G 1/22 |
| 2019/0011916 | A1 | 1/2019 | Alvarez Rodriguez et al. | |
| 2020/0324764 | A1 | 10/2020 | Johnson et al. | |
| 2021/0213948 | A1* | 7/2021 | Lahti | B60W 30/162 |
| 2021/0382480 | A1* | 12/2021 | Patnaik | B60W 30/165 |
| 2022/0198937 | A1* | 6/2022 | Meriçli | G05D 1/69 |

* cited by examiner

100

100

SYSTEMS AND METHODS FOR VEHICLE SIGNALING AND BARGAINING

CROSS-REFERENCE TO RELATED APPLICATIONS

This application claims priority to U.S. Provisional Patent Application No. 63/317,713, filed on Mar. 8, 2022, entitled "Biologically Inspired Connected Advanced Driver Assistance Systems (BICADAS)." The disclosure of which is hereby incorporated by reference in its entirety.

BACKGROUND

Advanced Driver Assistance Systems (ADAS) have become commonplace in the automotive industry over the last few decades. Even with the advent of ADAS, however, there are still a significant number of accidents and fatalities. ADAS has in some instances been shown to significantly reduce the number and severity of accidents. Manufacturers are working to avoid ADAS plateauing for effectiveness, which has led the industry to pursue various avenues of investment to ascend the next mountain of challenges—vehicle autonomy, smart mobility, connectivity, and electrification—for reducing accidents and injuries. A number of studies pertaining to ADAS scrutinize a specific ADAS technology for its effectiveness at mitigating accidents and reducing injury severity. A few studies take holistic accounts of ADAS. There are a number of directions ADAS could be further progressed. Industry manufacturers are improving existing ADAS technologies through multiple avenues of technological advancement. A number of ADAS systems have already been improved from passive, alert or warning, systems to active systems which provide early warning and if no action is taken will control the vehicle to avoid a collision or reduce the impact of the collision. Studies about the individual ADAS technologies have found significant improvement for reduction in collisions, but when evaluating the actual vehicles driving the performance of ADAS has been fairly constant since 2015.

SUMMARY

An improved vehicle signaling and control system is provided. In a first aspect the system uses existing sensors in a vehicle to detect when another vehicle is too close. When the too close vehicle is a following vehicle, the system may cause existing rear lights, such as rear brake lights, to activate and signal to a driver of the too close vehicle that they are too close and should slow down. When the too close vehicle is a leading vehicle, the system may cause existing front lights, such as rear headlights, to activate and signal to a driver of the vehicle that they are too close and should speed up. In addition, the system may detect, using the sensors, that a lane adjacent to the too close vehicle is empty, and may further activate lights such as turn signals to signal to the driver that they should change lanes.

In a second aspect, the system uses existing lights of a vehicle to establish a connection between the vehicle and a following or leading vehicle. The connection may be established using existing front and rear lights of the vehicle or using other V2V communication systems. The vehicles exchange information via the connection such as current speed and vehicle weight. Based on the received data, and data collected from other sensors of the vehicle, the system determines that a collision condition has been met. The collision condition may be that an actual collision between the vehicles will occur at some time in the future or that the vehicles will become more than a threshold distance apart. Once the collision connection is detected, the vehicles may enter a bargaining stage where various factors are considered to determine an optimal solution. These factors may include whether or not a vehicle is an emergency vehicle and whether lanes adjacent to either vehicle are occupied. The optimal solution may further consider factors such as minimizing passenger discomfort due to sudden acceleration changes.

In an embodiment, a method for improving the safety of vehicles is provided. The method includes: receiving data from one or more sensors of a first vehicle by a computing device of the first vehicle; based on the received data from the one or more sensors, determining that a second vehicle is traveling behind the first vehicle by the computing device of the first vehicle; based on the received data, determining that a distance between the first vehicle and the second vehicle is below a first threshold; and in response to the determination that the distance between the first vehicle and the second vehicle is below the first threshold, activating one or more lights on a rear of the first vehicle to signal to the second vehicle that the second vehicle is too close to the first vehicle.

In an embodiment, a method for improving the safety of vehicles is provided. The method includes: receiving sensor data from one or more sensors of a first vehicle by a computing device of the first vehicle; based on the received sensor data from the one or more sensors, determining that a second vehicle is traveling behind the first vehicle by the computing device of the first vehicle; establishing a connection between the first vehicle and the second vehicle by the computing device of the first vehicle; receiving second vehicle data from the second vehicle via the connection by the computing device of the first vehicle; using some or all of the received second vehicle data, first vehicle data from the first vehicle, and the received sensor data, determining that one or more collision conditions are satisfied by the computing device of the first vehicle; and in response to the determination that one or more collision conditions are satisfied, determining one or more actions based on the some or all of the received second vehicle data, first vehicle data from the first vehicle, and the received sensor data by the computing device of the first vehicle.

In an embodiment, a system for improving the safety of vehicles is provided. The system includes: at least one computing device connected to a first vehicle; and a computer-readable medium storing computer executable instructions that when executed by the at least one computing device cause the at least one computing device to: receive sensor data from one or more sensors of the first vehicle; based on the received sensor data from the one or more sensors, determine that a second vehicle is traveling behind the first vehicle; establish a connection between the first vehicle and the second vehicle; receive second vehicle data from the second vehicle via the connection; using some or all of the received second vehicle data, first vehicle data from the first vehicle, and the received sensor data, determine that one or more collision conditions are satisfied; and in response to the determination that one or more collision conditions are satisfied, determine one or more actions based on the some or all of the received second vehicle data, first vehicle data from the first vehicle, and the received sensor data.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated herein and form part of the specification, illustrate a vehicle signaling and bargaining system and method. Together with the description, the figures further serve to explain the principles of the vehicle signaling and bargaining system and method described herein and thereby enable a person skilled in the pertinent art to make and use the vehicle signaling and bargaining system and method.

DETAILED DESCRIPTION

Figure 1:
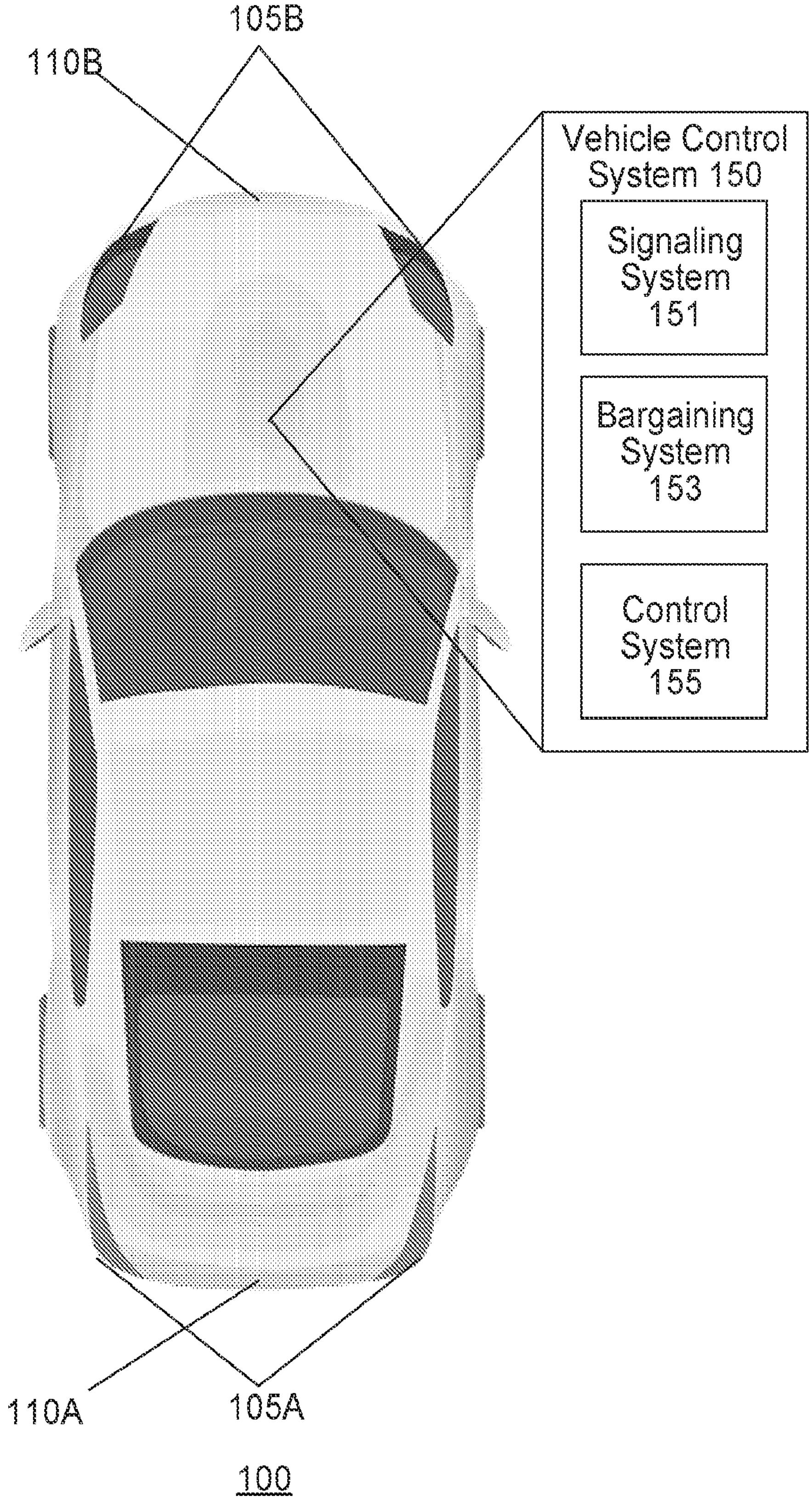
FIG. 1 is an illustration of an example vehicle including a vehicle control system.

FIG. 1 is an illustration of an example vehicle 100 including a vehicle control system 150. In the example shown, the vehicle 100 is a car. However, the vehicle control system 150 described herein is not limited to cars but may be used in variety of vehicles including, but not limited to, boats, motorcycles, planes, trucks, and helicopters.

The vehicle 100 may include a variety of sensors 110. The sensors 110 include a variety of sensor types and sensor technologies and may be used to determine the locations, including distances, of any objects external to the vehicle 100. These object may include pedestrians and other vehicles, for example. Suitable sensors 110 include cameras or image based sensors, LIDAR sensors, ultrasonic sensors, and RADAR sensors. Other types of sensors 110 may be supported. In the example shown, the vehicle 100 includes at least a rear sensor 110A and a front sensor 110B. The vehicle 100 may also include two or more side sensors 110.

The vehicle 100 may also include one or more lights 105. In the example shown, the lights 105 include rear lights 105A and front lights 105B. The front lights 105B may include the headlights, fog lights, and turn signals. The rear lights 105A may include brake lights, turn signals, and reverse lights. Other lights may be supported including side lights, interior lights, and lights on the side mirrors of the vehicle 100.

The sensors 110 may provide data to what is commonly known as an Advanced Driver Assistance Systems (ADAS) integrated into the vehicle 100. The ADAS can perform a variety of actions ranging from alerting a driver when they are outside of the driving lane, alerting the driver to nearby vehicles when the driver is making a lane change, and automatically applying the brakes when an object is detected in the front of the vehicle 100.

While ADAS systems are effective in reducing traffic accidents, they are limited to providing information to the driver of the vehicle 100 and cannot provide information or other information to drivers of other vehicles 100. Accordingly, in one embodiment, the vehicle control system 150 may include a signaling system 151. The signaling system 151 uses data from existing sensors 110 to detect certain unsafe conditions due to the actions of other vehicles 100 and may selectively activate one or more lights 105 to alert the driver of the other vehicles 100 to unsafe condition and/or nudge them to take corrective action.

For example, with respect to rear of the vehicle 100, one unsafe condition is a second vehicle 100 following the vehicle 100 too closely (i.e., tailgating). In some embodiments, the signaling system 151 may use the sensors 110A to detect a following second vehicle 100 and to measure the distance between the second vehicle 100 and the vehicle 100. If the distance is below a threshold distance, the signaling system 151 may determine that the second vehicle is too close. The threshold distance may be a static distance (e.g., ten feet), or may be variable based on information such as the current speed of the vehicle 100 or the second vehicle 100, current weather conditions (e.g., snow or rain), time of day (e.g., day or night), and the estimated size or weight of the vehicle 100 or the second vehicle 100. Any method for selecting a threshold may be used.

Figure 2A:
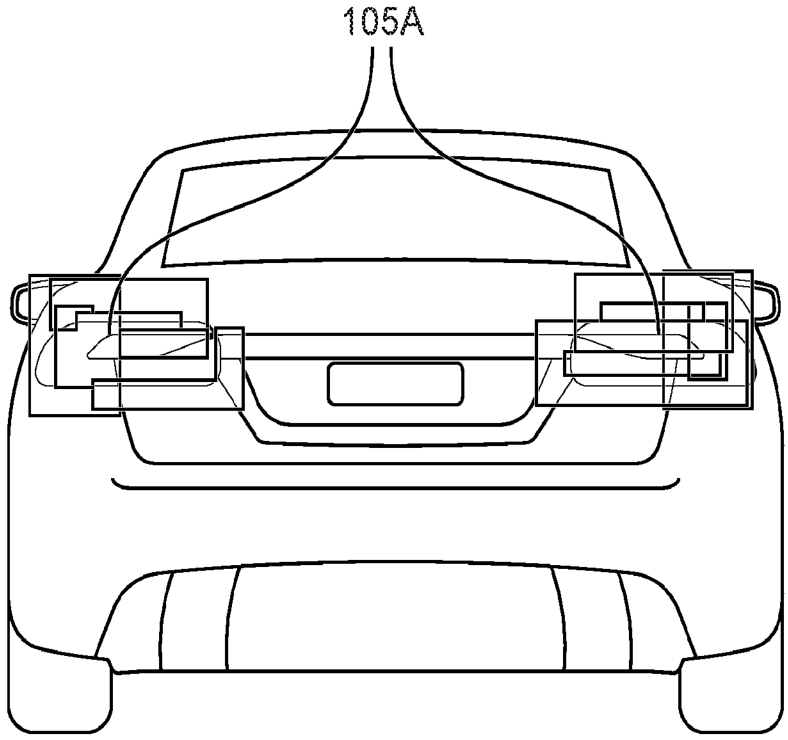
FIGS. 2A and 2B are illustrations of example vehicles performing rear signaling.

In response to detecting that the second vehicle 100 is too close, the signaling system 151 may use the rear lights 105A to signal the driver of the second vehicle 100 that they are too close. In the example shown in FIG. 2A, the signalizing system 151 has activated the rear brake lights 105A to signal to the driver of the second vehicle 100 that they should slow down. As may be appreciated because the brake lights 105A are already associated with braking, the driver of the vehicle 100 may instinctively activate their brakes upon seeing the brake lights 105A.

Depending on the embodiment, the signaling system 151 may cause the rear brake lights 105 to flash on and off or to stay activated until the distance between the vehicle 100 and the second vehicle 100 is above the distance threshold. Where the brake lights flash, they may be flashed in a pattern that is selected to be distinguishable from normal braking, and that through usage may become known to indicate following too closely to others.

Figure 2B:
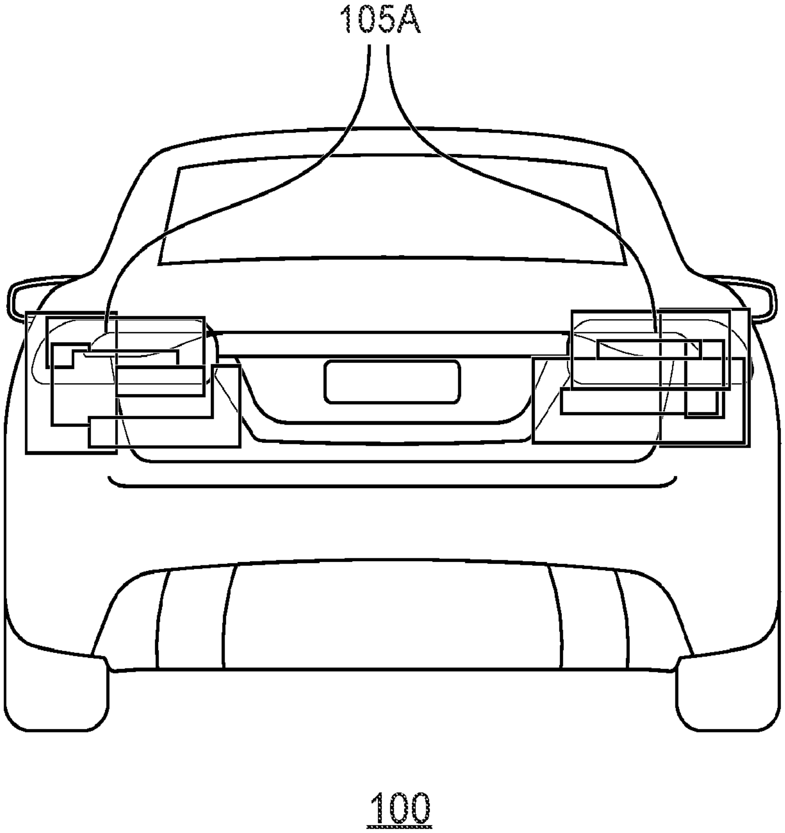

In some embodiments, the signaling system 151 may further determine if the lane adjacent to the second vehicle 100 is empty or clear and therefore available to the second vehicle 100. In the example shown in FIG. 2B, the signalizing system 151 has determined that the left lane is clear using the sensor 110A and has activated the left turn signal and the rear brake lights 105A to signal to the driver of the second vehicle 100 that they should slow down or move to the left lane. In the event that the right lane was clear, the signalizing system 151 may have also activated the right turn signal. The signaling system 151 may activate the turn signal using a pattern that is distinguishable from the pattern used when signaling a turn.

As another example, with respect to front of the vehicle 100, one unsafe condition is a second vehicle 100 too close to the front of the vehicle 100. The second vehicle 100 may be driving too slowly or may be driving in a passing lane. Similarly as described above, the signaling system 151 may use the sensors 110B to detect a second vehicle 100 and to measure the distance between the second vehicle 100 and the vehicle 100. If the distance is below the threshold distance, the signaling system 151 may determine that the second vehicle 100 is too close. The threshold distance may be the same or different than the threshold distance used above for the rear of the vehicle 100.

Figure 3A:
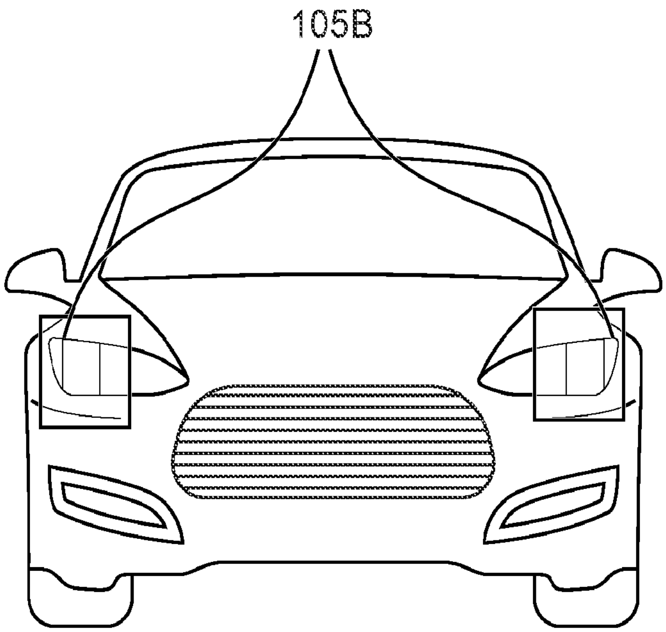
FIGS. 3A and 3B are illustrations of example vehicles performing front signaling.

In response to detecting that the second vehicle 100 is too close, the signaling system 151 may use the front lights 105B to signal the driver of the second vehicle 100 that they are too close. In the example shown in FIG. 3A, the signalizing system 151 has activated the headlights 105B to signal to the driver of the second vehicle 100 that they should speed up or get out of the way.

Figure 3B:
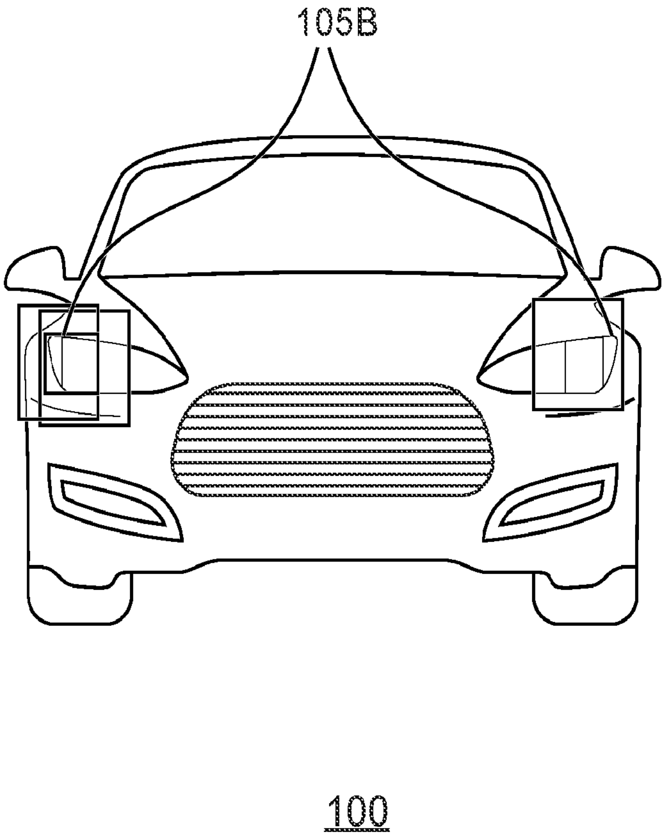

In some embodiments, the signaling system 151 may further determine if the lane adjacent to the second vehicle 100 is empty or clear and therefore available to the second vehicle 100. In the example shown in FIG. 3B, the signalizing system 151 has determined that the right lane is clear using the sensor 110B and has activated the right turn signal and the head lights 105B to signal to the driver of the second vehicle 100 that they should speed up or move to the right lane. In the event that the right lane was clear, the signalizing system 151 may have also activated the right turn signal. The signaling system 151 may activate the turn signal using a pattern that is distinguishable from the pattern used when signaling a turn.

Figure 6:
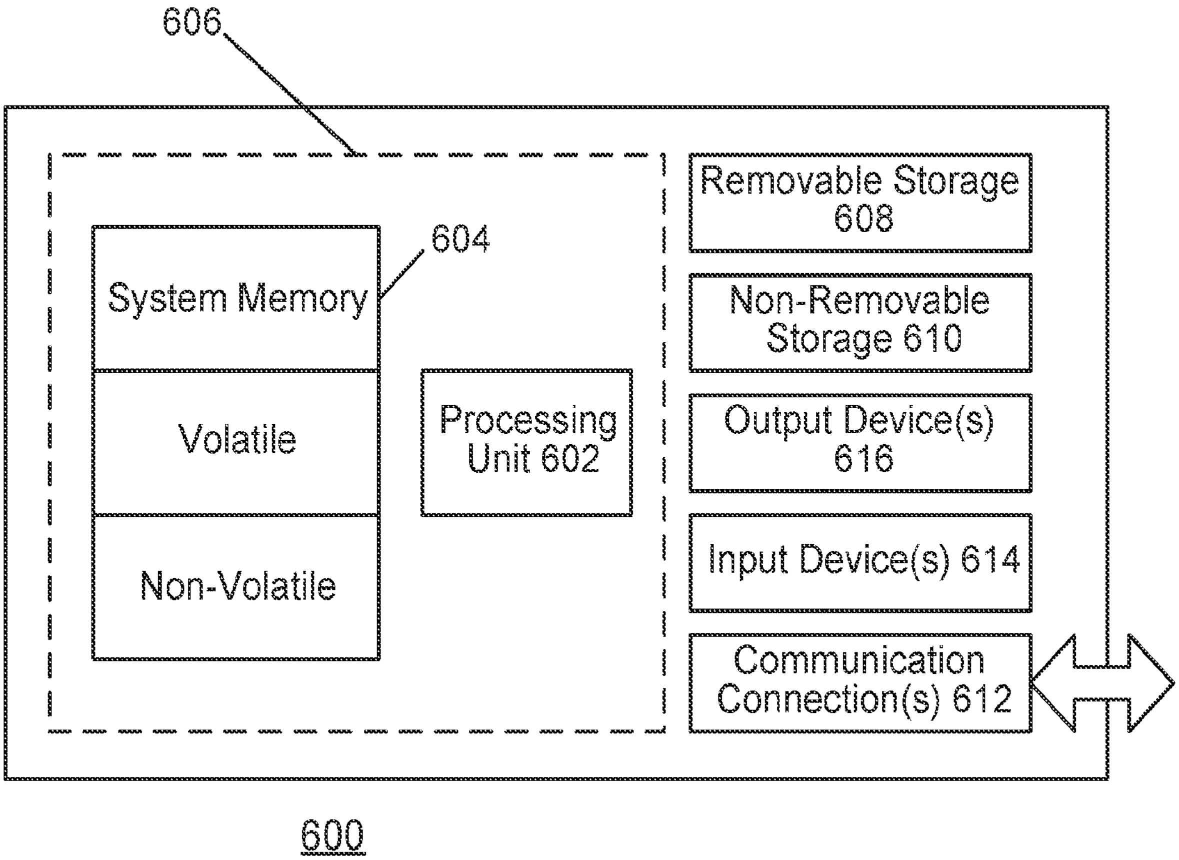
FIG. 6 shows an exemplary computing environment in which example embodiments and aspects may be implemented.

Returning to FIG. 1, the signaling system 151 described herein may be implemented using a computing device such as the computing device 600 described with respect to FIG. 6. The signaling system 151 may connect to, or interface with, an existing ADAS in the vehicle 100 and make use of existing lights 105 and sensors 110 of the vehicle 100. Accordingly, the signaling system 151 can be added to a vehicle 100 at a low cost and without significant modification of the vehicle 100. In other embodiments, the functionality of the signaling system 151 may be incorporated into the ADAS using a software or firmware update.

While the signaling system 151 described above is effective when signaling vehicles 100 without vehicle control systems 150 (referred to herein as dumb vehicles 100), when each vehicle 100 in an interaction include vehicle control systems 150 (referred to herein as smart vehicles 100), additional features and benefits may be realized.

In order to facilitate these additional features and benefits, the vehicle control system 150 may further include a bargaining system 153 and a control system 155. Each of the systems 153 and 155 may be implemented using a computing device such as the computing device 600.

The bargaining system 153 may allow two vehicles 100 to bargain on one or more actions for the vehicles 100 to perform to avoid what is referred to herein as a collision condition. The collision conditions may include a variety of vehicle 100 states that range from the vehicles 100 being closer than a threshold distance and the vehicles 100 actually colliding with each other. What constitutes a collision condition may be set by a user or administrator, for example.

The bargaining system 153 of a vehicle 100 may first detect whether or not a second vehicle 100 is in front of or behind the vehicle 100 using the sensors 110. In response to detecting the second vehicle 100, the vehicle 100 may attempt to establish a connection with the second vehicle 100. The established connection may be used to exchange information about each of the vehicles 100. If the vehicles 100 are unable to establish a connection, indicating that one of the vehicles is dumb, the bargaining system 153 may disengage and the signaling system 151 may communicate with the driver of the second vehicle 100 as described above.

In some embodiments, the bargaining system 153 may establish communication with the second vehicle 100 by activating the lights 105 in a selected pattern or sequence that is known to indicate that a connection is desired. In response to detecting the sequence, the bargaining system 153 of the second vehicle 100 may respond with another pattern or sequence that is known to indicate receipt of the request to connect. The bargaining system 153 may continue signaling back and forth until a connection is established. This process is known as handshaking.

In other embodiments, rather than connect and communicate through the lights 105, the vehicles 100 may communicate using a variety of other technologies including Wi-Fi, Bluetooth, and other V2V techniques. Other methods for communication may be used.

For example, the following table 1 describes a plurality of protocols that may be suitable for communication between the vehicles 100, including maximum range and throughput.

TABLE 1

| Protocol | Max Range | Max Throughput |
|---|---|---|
| DSRC | 1000 m | 54 Mbps |
| DGPS | Global | 57.6 kbps |
| VANETs | 200 m | 11 Mbps |
| MANETs | 250 m | 2 Mbps |
| Wi-Fi | 90 m | 2.4 Gbps |
| 3G | 3000 m | 42 Mbps |
| 4G | 3000 m | 1 Gbps |
| 5G | 3000 m | 50 Gbps |
| VLC (LED) | 2000 m | 500 Mbps |

Note that until the connection is established between the vehicle 100 and the second vehicle 100, both of the bargaining systems 153 should operate as if the other vehicle 100 is a dumb vehicle. That is the vehicle 100 should initially act in a greedy fashion, doing what is best for the safety of the individual vehicle 100.

Once the connection is established between the two vehicles 100, the vehicles 100 may begin sharing data about each vehicle 100 through the connection (e.g., by activating the lights 105 in an agreed upon pattern or code, or through the V2V system used). In some embodiments, the exchanged data may include physics related data such as the current speed of the vehicle 100, the current weight of the vehicle 100, and the relative position of the vehicle 100. Other information may be included such as whether the vehicle 100 is an emergency vehicle.

Note that with respect to the weight of the vehicle 100, it may be difficult to communicate the weight of the vehicle using the lights 105. Accordingly, rather than communicate the weight of the vehicle 100, the vehicle 100 may communicate its weight class (e.g., compact car, sedan, or truck), and the bargaining system 153 may then infer the weight of the vehicle 100. Alternatively, or additionally the bargaining system 153 may use the sensors 110 to determine a make and model of the vehicle 100 and may determine the weight of the vehicle based on the make and model and a lookup table.

After receiving the data from the vehicle 100, the bargaining system 153 may determine if one or more collisions conditions exist. Depending on the embodiment, the bargaining system 153 may determine collision conditions in two ways. The first is by directly determining the position, velocity, and acceleration of the vehicles 100 and determining if they will intersect with each other, thus resulting in a collision. The other is to establish fields (i.e., distance thresholds) in front and behind the smart-vehicle based on its own travel velocity. If these fields are violated by another vehicle 100 then the vehicle 100 responds through the established process of first moving to the safest location before bargaining to a more optimal location.

In order to determine the collision conditions, the bargaining system 153 may use the following equations 1-5. The a, F, m, t, x, v in Equations 1-4 are for acceleration, force, mass, time, distance, and velocity, respectively. Denominations of subscript 0 indicate an initial value. For equation 1, the equation means that the final velocity is equal to the initial velocity plus the acceleration multiplied by time. Since acceleration is the derivative of velocity with respect to time, equation 1 is really the final velocity is equal to the initial velocity plus the change in velocity. For equation 2, is developed by transforming t based on the definition of acceleration previously mentioned. Equation 3 is from the definition of velocity being the derivative of position with respect to time, so multiplying the velocity by time yields the final position. Equation 4 is developed by combining equations 1 and 2 and using the definitions for velocity and acceleration. Equation 5 is Newton's second law of motion.

$$v = v_0 + at \tag{1}$$

$$v^2 = v_0^2 + 2a(x - x_0) \tag{2}$$

$$x = vt \tag{3}$$

$$x = x_0 + v_0 t + \frac{1}{2}at^2 \tag{4}$$

$$\vec{F} = m\vec{a} \tag{5}$$

In some embodiments, in order to determine the safe following distances between two vehicles, the following table 2 related speeds to following distances for a variety of driving conditions may be used.

| Travel Speed | | Following Distance | | Common Locations of Speeds |
|---|---|---|---|---|
| mph | kph | Meters | Yards | Used for Roads in the US |
| 10 | 16 | 13 | 14 | Parking lot speed |
| 25 | 40 | 34 | 37 | Residential areas |
| 35 | 56 | 47 | 51 | Urban 4-lane roads |
| 45 | 72 | 60 | 66 | Urban highway |
| 55 | 89 | 74 | 81 | County highway |
| 65 | 105 | 87 | 95 | Interstate highways |
| 80 | 129 | 107 | 117 | Max speed limit in US |
| 140 | 225 | 188 | 206 | Max speed of US vehicles |

After determining that one or more collision conditions exits how the bargaining system 153 proceeds may depend on whether both vehicles 100 are smart vehicles (i.e., able to bargain), one vehicle 100 is smart and the other vehicle 100 is a semi-smart vehicle 100 (i.e., able to send signals but not bargain) or one vehicle 100 is smart and the other vehicle 100 is dumb (i.e., unable to signal or bargain).

In the case of smart to smart, both vehicles 100 would use their lights to indicate to each other based on the pre-described patterns. Once the signals have been transmitted by the lights 105 and received by the sensors 110, the vehicles 100 would move according to the optimized plan for the grouping. In the second case of smart to semi-smart, the semi-smart vehicle 100 would be able to send signals, but it would be unable to automatically act on the information transferred. It would be beneficial for the semi-smart vehicle 100 in that should another vehicle 100 become likely to collide with it, it can signal the other vehicle 100.

In the case of the other vehicle being a smart vehicle 100, it can take action, and in the case of a dumb vehicle, the light signals from the smart vehicle 100 can still signal the dumb vehicle's 100 driver of the impending collision. In the other case of smart to dumb, the smart vehicle 100 would transmit the signals and there would be no visual response by the dumb vehicle 100. The advantage here is the light signaling could be seen by the dumb vehicle's 100 driver who could react accordingly.

In some embodiments, where both vehicles 100 are smart vehicles 100, the bargaining system 153 may determine one or more actions to perform by either vehicle 100 to best avoid the determined collision conditions. Two main approaches to determine the optimal actions include determining Archimedean (goal weighting) and Lexicographic (rank ordering) optimums. Finding the Archimedean optimum is achieved by weighting the values of each goal in a set and comparing the set values, and finding the Lexicographic optimum is found by comparing a hierarchy of goals from different sets. Both approaches are useful for assigning a hierarchy of importance to goals. Other approaches such as mapping the goals to the criterion space can be done to find the best possible outcome.

The objective of the bargaining system 153 may be to avoid collisions (i.e., to minimize the one or more collision conditions). In some embodiments, the bargaining system 153 may avoid collision while also adhering to some or all of the following goals. These goals include 1) maintaining at least a safe distance between vehicles 100 (i.e., the distances in table 1; 2) to have as low of a change in acceleration felt by the vehicle 100 occupants; and 3) to not impede the travel of emergency vehicles (e.g., police cruisers, ambulances, and fire trucks). In the case where the weight is only as detailed as to which weight class it belongs, a lexicographic approach may be preferable for finding the objective.

In some embodiments, the bargaining system 153 may determine the optimal actions for a vehicle 100 to take using the objective function shown in the following equation 6 where $v_1$ and $v_2$ are the velocities of the first vehicle 100 and the second vehicle 100, $e_1$ and $e_2$ are the emergency vehicle status of the first vehicle 100 and the second vehicle 100, and d is the distance between the first vehicle 100 and second vehicle 100. These values may have been exchanged between the vehicles 100 using the connection as described above.

In the equation 6, $\bar{x}$ is an array of input variable. The weights assigned to each part of the objective function are for the emergency vehicle function, 0.3 for the maintaining at least a minimum safe follow distance function, and 0.1 for the minimum acceleration felt by occupants of the vehicle 100. Other weights may be used and may be set by a user or administrator.

$$\min(F(\bar{x})) = 0.6E(\bar{e}) + 0.3D(\bar{v}, \bar{d}) + 0.1A(\bar{v}) \tag{6}$$

The objection function of equation 6 is subject to the constraints of the following equations 7 and 8. Equation 7 is based on the maximum acceleration that the average vehicle 100 is capable of before losing control. This value may be adjusted where the vehicle 100 is known to be a higher-end vehicle. Equation 8 may take values from the table 1 discussed above.

$$a \leq 4.6\ \text{m/s}^2 \tag{7}$$

$$\Delta v \leq 4.6\ \text{m/s} \tag{8}$$

The bargaining system 153 may determine the one or more actions to perform by either of the vehicles 100 by minimizing the objective function described in equation 6. In particular, the bargaining system 153 may determine the minimum changes to the velocities of one or more of the vehicles 100 that results in the avoidance of the collision condition.

The control system 155 may cause the vehicle 100 to perform one or more actions based on the determination of the bargaining system 153. In some embodiments, the one or more actions may include increasing the velocity of the vehicle 100, decreasing the velocity of the vehicle 100, and changing a current traveling lane of the vehicle 100. Other actions may be supported. The control system 155 may interface with a navigation system and/or safety system of the vehicle 100 and may provide instructions to the navigation system or safety system to perform the one or more actions. Other methods for causing a vehicle 100 to perform an action may be used.

Figure 4:
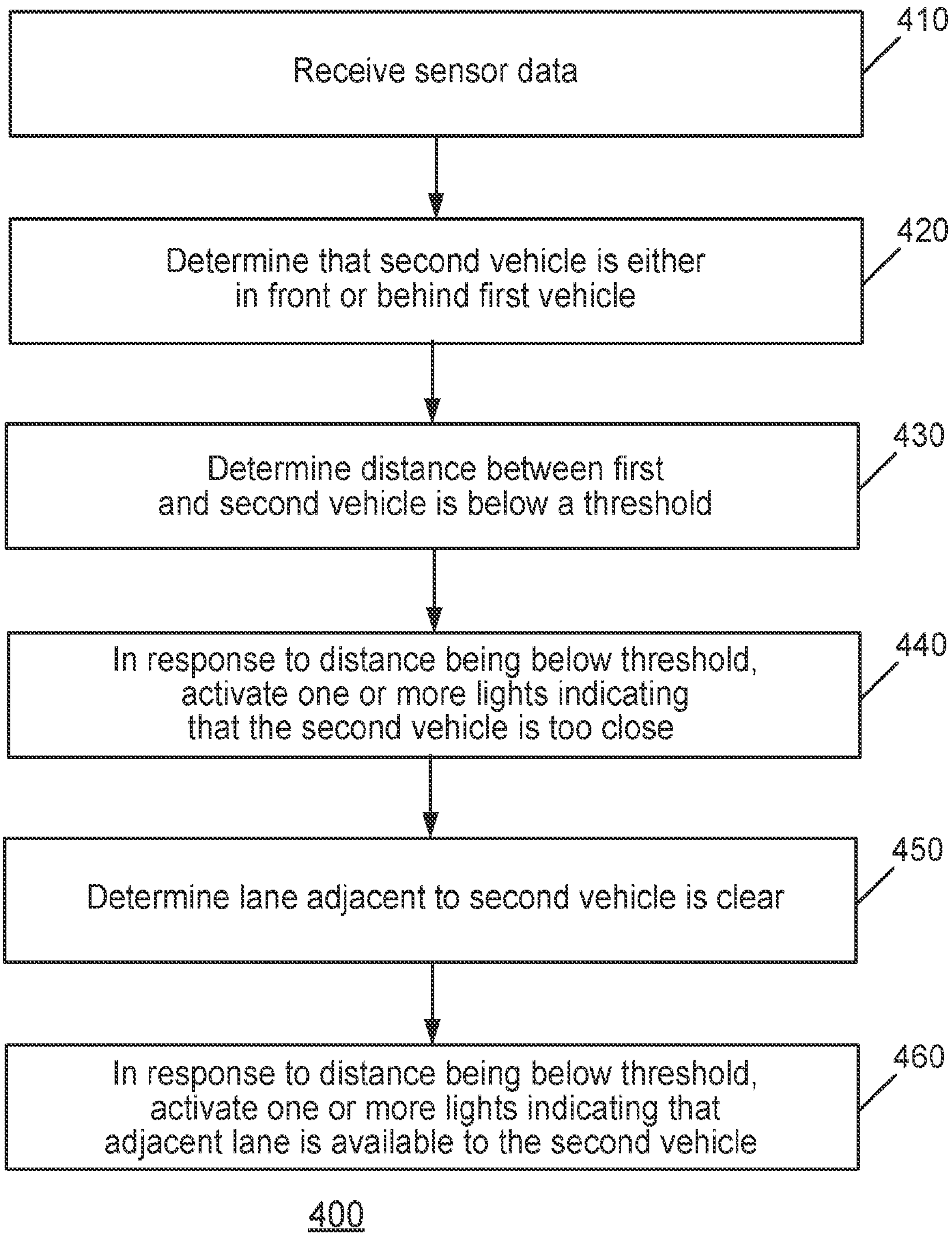
FIG. 4 is an illustration of an example method for signaling to another vehicle.

FIG. 4 is an illustration of an example method for signaling to another vehicle 100. The method 400 may be implemented in part by the signaling system 151 of the vehicle control system 150.

At 410, sensor data is received. The sensor data may be received by the signaling system 151 from the sensors 110 of the first vehicle.

At 420, that a second vehicle is either in front or behind the first vehicle is determined. The determination may be made by the signaling system 151 using the sensor data.

At 430, that a distance between the first vehicle and the second vehicle is below a threshold is determined. The determination may be made by the signaling system 151 using the sensor data. The threshold may be a static threshold or may be a dynamic threshold that changes based on data such as the velocity and weight of the first vehicle 100, and weather conditions that may affect braking distances such as snow or rain.

At 440, one or more lights indicating that the second vehicle is too close are activated in response to determining that the distance between the first vehicle and the second vehicle is below the threshold. If the second vehicle 100 is in front of the first vehicle 100, the signaling system 151 may activate the front lights 105B. If the second vehicle 100 is behind the first vehicle 100, the signaling system 151 may activate the back lights 105A. Depending on the embodiment, the signaling system 151 may activate the lights 105 in a predetermined pattern or sequence and/or may activate the lights 105 until the distance is above the threshold.

At 450, that a lane adjacent to the second vehicle is clear is determined. That the lane is clear may be determined by the signaling system 151 using the sensor data.

At 460, one or more lights indicating that an adjacent lane is available to the second vehicle are activated in response to determining that the lane adjacent to the second vehicle is clear. The lights 105 may be activated by the signaling system 151. In some embodiments, the activated lights may be the turn signal lights corresponding to the location of the clear lane.

Figure 5:
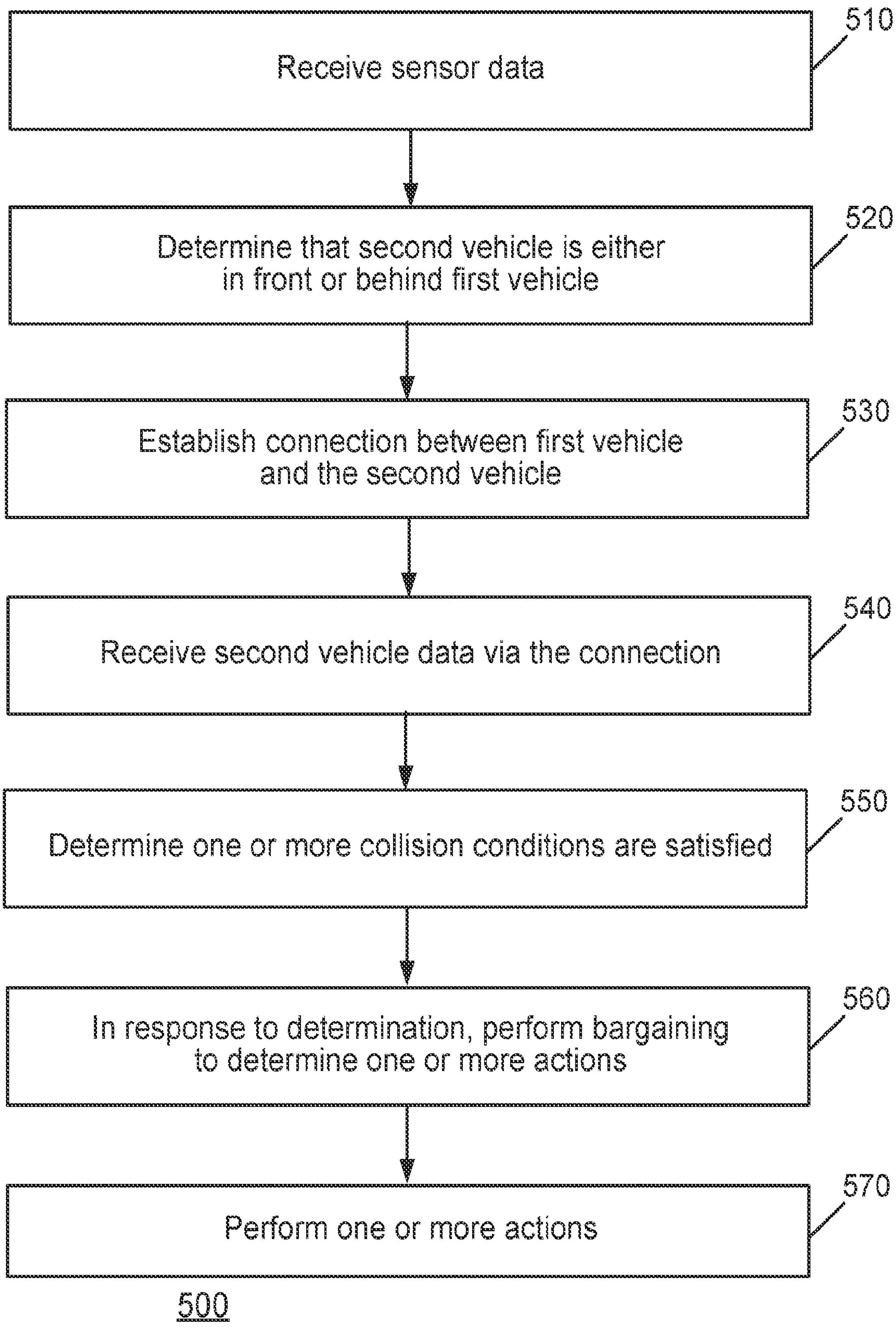
FIG. 5 is an illustration of an example method for performing bargaining by two vehicles.

FIG. 5 is an illustration of an example method for performing bargaining by two vehicles 100. The method 500 may be implemented in part by the vehicle control system 150.

At 510, sensor data is received. The sensor data may be received by the signaling system 151 from the sensors 110 of the first vehicle 100.

At 520, that a second vehicle 100 is either in front or behind the first vehicle 100 is determined. The determination may be made by the signaling system 151 using the sensor data.

At 530, a connection between the first vehicle 100 and the second vehicle 100 is established. The connection may be established by the bargaining system 153 using a handshaking procedure where each of the first vehicle 100 and the second vehicle 100 cause the lights 105 to activate in a predetermined sequence or pattern. Alternatively, the connection may be established using V2V or another wireless communication protocol.

At 540, second vehicle data is received via the connection. The second vehicle data may be received by the bargaining system 153 via the connection. The second vehicle data 100 may include data such as the velocity and weight of the second vehicle 100.

At 550, that one or more collision conditions are satisfied is determined. The determination may be made by bargaining system 153. Depending on the embodiments, a collision condition may include a predicted collision between the first vehicle 100 and the second vehicle 100 based on the second vehicle data and first vehicle data. Alternatively, or additionally, a collision condition may include a prediction that the second vehicle 100 may be within a threshold distance of the first vehicle 100 based on the second vehicle data and the first vehicle data.

At 560, in response to the determination that one or more collision conditions are satisfied, bargaining may be performed to determine one or more actions. The bargaining may be performed by the bargaining system 153 based on the first vehicle data and the second vehicle data. In some embodiments, the bargaining may be performed by optimizing a an objective function that considers a variety of factors such as whether or not the first vehicle 100 or the second vehicle 100 is an emergency vehicle, minimizing acceleration forces experienced by occupants of the first vehicle 100 of the second vehicle 100 due to increasing or decreasing the speeds of either the first vehicle 100 of the second vehicle 100, and maintaining a minimum distance between the first vehicle 100 and the second vehicle 100. In addition, whether or not there is a lane adjacent to either the first vehicle 100 or the second vehicle 100 may also be considered by the bargaining system 153. The result of the bargaining may be one or more actions for one or both of the first vehicle 100 or the second vehicle 100 to perform. The one or more actions may include increasing a speed of a vehicle 100, decreasing a speed of a vehicle 100, or moving to an adjacent lane by a vehicle 100.

At 570, the one or more actions are performed. The one or more actions may be performed by the control system 155.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for improving the safety of vehicles comprising:

receiving sensor data from one or more sensors of a first vehicle by a computing device of the first vehicle;

based on the received sensor data from the one or more sensors, determining that a second vehicle is traveling behind the first vehicle by the computing device of the first vehicle;

establishing a connection between the first vehicle and the second vehicle by the computing device of the first vehicle;

receiving second vehicle data from the second vehicle via the connection by the computing device of the first vehicle;

using some or all of the received second vehicle data, first vehicle data from the first vehicle, and the received sensor data, determining that one or more collision conditions are satisfied by the computing device of the first vehicle;

in response to the determination that one or more collision conditions are satisfied, performing bargaining with the second vehicle, wherein performing bargaining with the second vehicle comprises performing bargaining using an objective function that considers factors including minimizing acceleration forces in the first vehicle and the second vehicle, and maintaining a minimum distance between the first vehicle and the second vehicle; and determining one or more actions based on the bargaining and some or all of the received second vehicle data, first vehicle data from the first vehicle, and the received sensor data by the computing device of the first vehicle.

2. The method of claim 1, wherein the one or more actions comprise one or more of increasing a speed of the first vehicle, decreasing the speed of the second vehicle, changing a lane by the first vehicle, and changing a lane by the second vehicle.

3. The method of claim 1, wherein establishing the connection between the first vehicle and the second vehicle comprises establishing the connection using one or more rear lights of the first vehicle and one or more front lights of the second vehicle.

4. The method of claim 1, wherein the received second vehicle data comprises one or more of a current velocity of the second vehicle, a weight of the second vehicle, a weight class of the second vehicle, and whether or not the second vehicle is an emergency vehicle.

5. The method of claim 1, wherein the first vehicle data comprises one or more of a current velocity of the first vehicle, a weight of the first vehicle, a weight class of the first vehicle, and whether or not the first vehicle is an emergency vehicle.

6. The method of claim 1, further comprising transmitting the first vehicle data to the second vehicle via the connection.

7. The method of claim 1, if no connection can be established between the first vehicle and the second vehicle:

based on the received data from the one or more sensors, determining that a distance between the first vehicle and the second vehicle is below a first threshold; and in response to the determination that the distance between the first vehicle and the second vehicle is below the first threshold, activating one or more lights on the rear of the first vehicle to signal to the second vehicle that the second vehicle is too close to the first vehicle.

8. The method of claim 1, wherein performing bargaining with the second vehicle further comprises negotiating with the second vehicle, using at least some of the received second vehicle data and first vehicle data, to determine the one or more actions.

9. The method of claim 1, wherein establishing the connection between the first vehicle and the second vehicle comprises, by a bargaining system, performing a handshaking procedure in which each of the first vehicle and the second vehicle causes lights to activate in a predetermined sequence or pattern.

10. The method of claim 1, wherein establishing the connection between the first vehicle and the second vehicle comprises establishing the connection using V2V or another wireless communication protocol.

11. A system for improving the safety of vehicles comprising:

at least one computing device connected to a first vehicle; and a computer-readable medium storing computer executable instructions that when executed by the at least one computing device cause the at least one computing device to:

receive sensor data from one or more sensors of the first vehicle;

based on the received sensor data from the one or more sensors, determine that a second vehicle is traveling behind the first vehicle;

establish a connection between the first vehicle and the second vehicle;

receive second vehicle data from the second vehicle via the connection;

using some or all of the received second vehicle data, first vehicle data from the first vehicle, and the received sensor data, determine that one or more collision conditions are satisfied;

in response to the determination that one or more collision conditions are satisfied, perform bargaining with the second vehicle, wherein performing bargaining with the second vehicle comprises performing bargaining using an objective function that considers factors including minimizing acceleration forces in the first vehicle and the second vehicle, and maintaining a minimum distance between the first vehicle and the second vehicle; and determine one or more actions based on the bargaining and the some or all of the received second vehicle data, first vehicle data from the first vehicle, and the received sensor data.

12. The system of claim 11, wherein the one or more actions comprise one or more of increasing the speed of the first vehicle, decreasing the speed of the second vehicle, changing a lane by the first vehicle, and changing a lane by the second vehicle.

13. The system of claim 11, wherein establishing the connection between the first vehicle and the second vehicle comprises establishing the connection using one or more rear lights of the first vehicle and one or more front lights of the second vehicle.

14. The system of claim 11, wherein the received second vehicle data comprises one or more of a current velocity of the second vehicle, a weight of the second vehicle, a weight class of the second vehicle, an whether or not the second vehicle is an emergency vehicle.

15. The system of claim 11, wherein the first vehicle data comprises one or more of a current velocity of the first vehicle, a weight of the first vehicle, a weight class of the first vehicle, and whether or not the first vehicle is an emergency vehicle.

* * * * *